(12) United States Patent
Booth et al.

(10) Patent No.: US 11,882,215 B2
(45) Date of Patent: Jan. 23, 2024

(54) HANDLING JOINING AND LEAVING OF PARTICIPANTS IN VIDEOCONFERENCING WITH END-TO-END ENCRYPTION

(71) Applicant: Zoom Video Communications, Inc., San Jose, CA (US)

(72) Inventors: Simon Booth, Livermore, CA (US); Karan Lyons, Los Angeles, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 145 days.

(21) Appl. No.: 17/327,289

(22) Filed: May 21, 2021

(65) Prior Publication Data

US 2022/0376895 A1 Nov. 24, 2022

(51) Int. Cl.
*H04L 9/30* (2006.01)
*H04L 9/32* (2006.01)
*H04L 9/08* (2006.01)
*H04N 7/15* (2006.01)

(52) U.S. Cl.
CPC ............... *H04L 9/088* (2013.01); *H04L 9/30* (2013.01); *H04L 9/3247* (2013.01); *H04N 7/15* (2013.01)

(58) Field of Classification Search
CPC ....... H04L 63/062; H04L 63/065; H04L 9/30; H04L 63/0435; H04L 9/3247; H04L 63/101; H04L 9/088; H04L 63/126; H04L 63/045; H04L 63/0442; H04L 2463/062; H04N 7/15
See application file for complete search history.

(56) References Cited

U.S. PATENT DOCUMENTS 5,737,419 A * 4/1998 Ganesan ............... H04L 9/3218
713/169
7,707,643 B2 * 4/2010 DeMello ................. G06F 21/10
726/28

(Continued)

OTHER PUBLICATIONS

EP International Search Report and Written Opinion for PCT/US2022/027605 dated Aug. 4, 2022.

(Continued)

*Primary Examiner* — Mohammad A Siddiqi
(74) *Attorney, Agent, or Firm* — Kilpatrick Townsend & Stockton LLP

(57) ABSTRACT

One disclosed example method includes a leader client device associated with a leader participant generating a meeting key for a video meeting joined by multiple participants. For each participant, the leader client device obtains a long-term public key and a cryptographic signature associated with the participant. The leader client device verifies the cryptographic signature of the participant based on the long-term public key and the cryptographic signature. If the verification is successful, the leader client device encrypts the meeting key for the participant using a short-term private key generated by the leader client device, a short-term public key of the participant, a meeting identifier, and a user identifier identifying the participant. The leader client device further publishes the encrypted meeting key for the participant on the meeting system. The leader client device encrypts and decrypts meeting data communicated with other participants based on the meeting key.

20 Claims, 8 Drawing Sheets

(56) References Cited

U.S. PATENT DOCUMENTS

| | | | | |
|---|---|---|---|---|
| 2002/0191797 | A1* | 12/2002 | Perlman | H04L 9/088 |
| | | | | 713/153 |
| 2005/0232428 | A1* | 10/2005 | Little | H04L 9/3226 |
| | | | | 380/277 |
| 2005/0251680 | A1* | 11/2005 | Brown | H04W 12/069 |
| | | | | 713/171 |
| 2011/0103588 | A1* | 5/2011 | Little | H04W 12/069 |
| | | | | 380/277 |
| 2011/0194694 | A1* | 8/2011 | Struik | H04L 9/3252 |
| | | | | 380/255 |
| 2013/0301828 | A1* | 11/2013 | Gouget | H04L 9/0877 |
| | | | | 380/44 |
| 2015/0222517 | A1* | 8/2015 | McLaughlin | H04L 9/006 |
| | | | | 713/171 |
| 2019/0140832 | A1 | 5/2019 | Leavy et al. | |
| 2020/0228973 | A1 | 7/2020 | Kasabwala et al. | |
| 2022/0021530 | A1* | 1/2022 | Kupwade Patil | H04L 9/0825 |
| 2022/0343005 | A1* | 10/2022 | Hanna | H04L 9/3297 |

OTHER PUBLICATIONS

Blum et al., "E2E Encryption for Zoom Meetings", https://github.com/zoom/zoom-e2e-whitepaper/raw/master/archive/zoom_e2e_v3.pdf, Dec. 15, 2020; pp. 1-55.

Isobe et al., "Security Analysis of End-to-End Encryption for Zoom Meetings", IACR, International Association For Cryptologic Research, Apr. 15, 2021; pp. 1-25.

\* cited by examiner

HANDLING JOINING AND LEAVING OF PARTICIPANTS IN VIDEOCONFERENCING WITH END-TO-END ENCRYPTION

FIELD

The present application generally relates to videoconferences and more particularly relates to systems and methods for handling joining and leaving of participants in videoconferencing with end-to-end encryption.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for handling the joining and leaving of participants in videoconferencing with end-to-end encryption. One example method includes joining, by a client device associated with a leader of a video meeting, the video meeting by connecting to a meeting server of a meeting system configured to handle the video meeting; generating a short-term encryption keypair for the video meeting comprising a short-term public key and a short-term private key; generating a meeting key for the video meeting; obtaining a list of participants of the video meeting. The method further comprise for each participant in the list of participants, obtaining a long-term public key associated with the participant from a key server; obtaining a cryptographic signature of the participant from the meeting system; verifying the cryptographic signature of the participant based on the long-term public key associated with the participant, a short-term public key associated with the participant, the cryptographic signature of the participant, participant information of the participant, and meeting information of the video meeting; in response to the verification being successful, encrypting the meeting key for the participant using the short-term private key, a short-term public key of the participant, a meeting identifier, and a user identifier identifying the participant; and publishing the encrypted meeting key for the participant on the meeting system; receiving meeting data from each of the participants encrypted based on the meeting key; and decrypting the meeting data for presentation based on the meeting key.

Another example method includes joining, by a client device associated with a non-leader participant of a video meeting, the video meeting by connecting to a meeting system configured to handle the video meeting; generating a short-term encryption keypair comprising a short-term public key and a short-term private key; obtaining a long-term public key of a leader participant of the video meeting from the meeting system; obtaining a participant cryptographic signature of the leader participant and a short-term public key of the leader participant from the meeting system; verifying the participant cryptographic signature of the leader participant based on a long-term public key of the leader participant, a short-term public key of the leader participant obtained from the meeting system, the participant cryptographic signature of the leader participant, participant information of the leader participant and meeting information of the video meeting; obtaining an encrypted meeting key for the non-leader participant from the meeting system; decrypting the meeting key using the short-term private key of the non-leader participant, the short-term public key of the leader participant, the meeting information, a participant identifier of the leader participant, and a participant identifier of the non-leader participant; encrypting meeting data based on the meeting key; and transmitting the meeting data to the meeting system.

One example system includes a non-transitory computer-readable medium; and a processor communicatively coupled to the non-transitory computer-readable medium, the processor configured to execute processor-executable instructions stored in the non-transitory computer-readable medium to perform operations. The operations comprise generating a short-term encryption keypair for a video meeting comprising a short-term public key and a short-term private key; generating a meeting key for the video meeting; obtaining a list of participants of the video meeting. The operations further comprise for each participant in the list of participants, obtaining a long-term public key associated with the participant from a key server; obtaining a cryptographic signature of the participant from a meeting system configured for managing the video meeting; verifying the cryptographic signature of the participant based on the long-term public key associated with the participant, a short-term public key associated with the participant, the cryptographic signature of the participant, participant information of the participant, and meeting information of the video meeting; in response to the verification being successful, encrypting the meeting key for the participant using the short-term private key, a short-term public key of the participant, a meeting identifier, and a user identifier identifying the participant; and publishing the encrypted meeting key for the participant on the meeting system; receiving meeting data from each of the participants encrypted based on the meeting key; and decrypting the meeting data for presentation based on the meeting key.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of certain examples.

DETAILED DESCRIPTION

Figure 1:
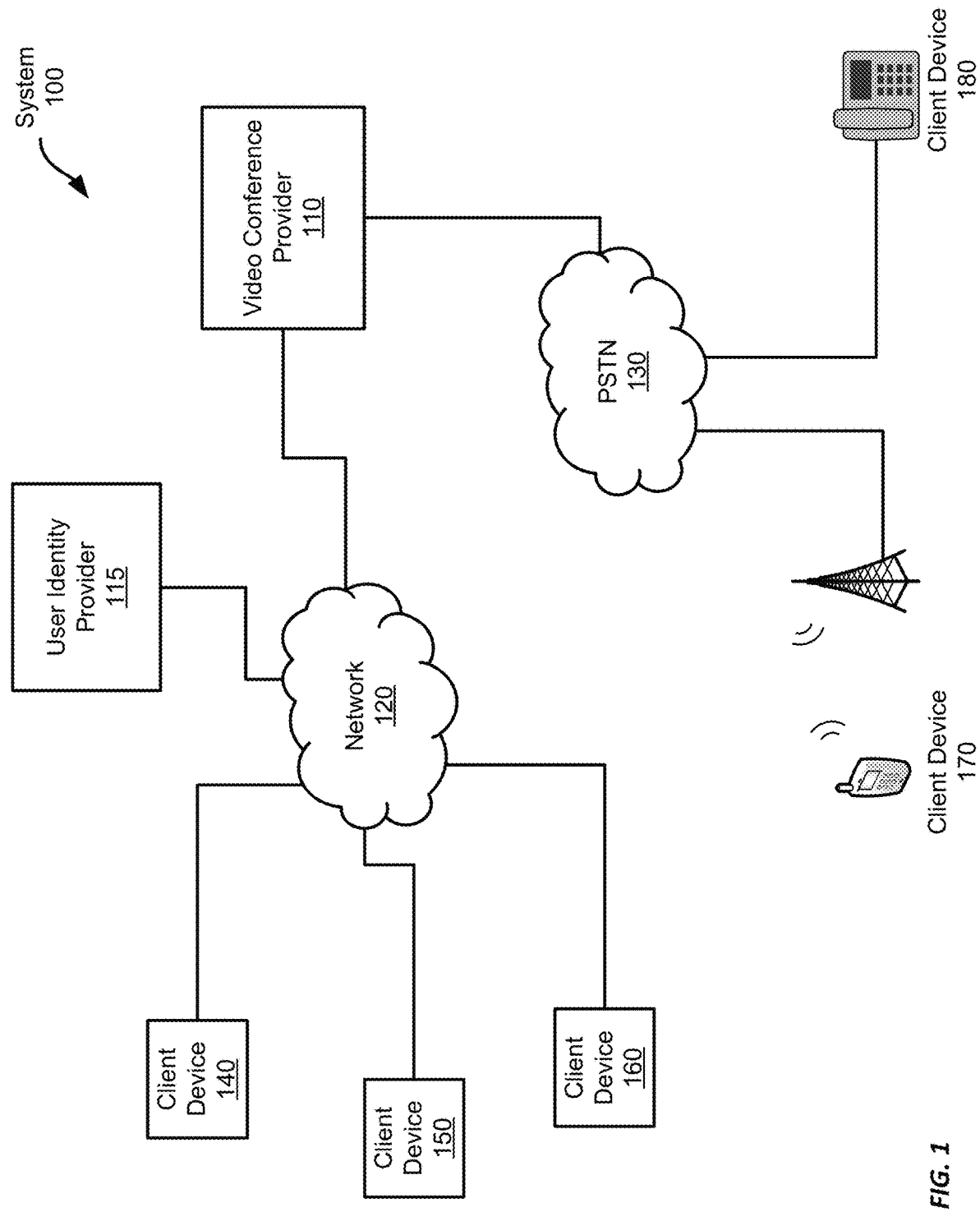
FIG. 1 shows an example system that provides videoconferencing functionality to various client devices, according to certain aspects described herein.

Examples are described herein in the context of systems and methods for handling the joining and leaving of participants in videoconferencing with end-to-end encryption. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may wish to keep the contents of the video conference confidential and only available to certain authorized personnel. This can be done by encrypting audio and video that is streamed between participants to a video conference. In the existing videoconferencing system, the keys used to encrypt the audio and video and other data are generated and maintained by the video conference provider. However, the video conference provider's servers may be "untrusted" by the participants, meaning the provenance and identity of the servers may not be verifiable by the participants or may otherwise be suspect. In some cases, the audio or video may include confidential information that should not be accessible by the video conference provider, e.g., by law or regulation. Further, the participants themselves may simply not want the video conference provider to have access to the content of the video conference.

End-to-end encryption allows the participants to share meeting keys used to encrypt the meeting content among themselves without revealing the keys to the video conference provider. Because the video conference provider no longer has access to the meeting keys, the process for generating and distributing the meeting keys when participants join and leave the meeting is different from the existing videoconferencing systems and needs to be designed to maintain the security of the end-to-end encryption.

To create a videoconference (or a "video meeting" or a "meeting"), a person (referred to as the "host" or "meeting host") accesses the videoconferencing system, creates a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. Sometimes, a meeting has one or more "co-host" specified by the host to facilitate the managing of the meeting. In this disclosure, "participants" include all the entities participating in the meeting, including the host, the co-host(s), and other attendees. The term "participant" may also be used to refer to the client device (or more specifically the meeting client application executing on the client device) associated with or used by the participant. The meaning of this term will be clear when read in the context.

In a videoconferencing configured with end-to-end encryption, each participant generates a short-term encryption keypair including a short-term public key and a short-term private key to be used for the current instance of the meeting. A leader participant (e.g., the host or co-host of the meeting or another participant) generates a meeting key for the meeting. The leader participant further distributes, to the rest of the participants ("non-leader participants"), the meeting key in an encrypted format using the short-term public keys of the respective non-leader participants through the video conference provider. Each of the non-leader participants decrypts the meeting key after receiving it and uses the decrypted meeting key to encrypt and decrypt the meeting data (e.g., audio, video, or text).

For example, when joining a meeting, each participant of the meeting (including the host and co-host(s)) is configured to register with a key server using a long-term key and obtain a server signature from the key server. A participant can share the server signature with other participants to authenticate the participant. In addition, each participant generates a short-term encryption keypair including a short-term public key and a short-term private key to be used for the current instance of the meeting. Each participant further generates a participant signature using its short-term keypair. In some examples, the participant signs the participant signature with its long-term key pair. In this way, the short-term key pair is bound to the long-term key pair. In some examples, each participant signs the short-term key pair along with additional context when generating the participant signature that further binds the short-term keypair to the specific meeting. The server signatures and participant signatures of the participants can be shared with each other to verify the authenticity of the participants. The participants can share the server signatures and participant signatures by sending them to the video conference provider from which the other participants can retrieve these signatures.

When a leader participant (or a "leader") joins the meeting, the client device associated with the leader ("leader client device") generates a meeting key to be used to encrypt and decrypt the meeting content. The leader client device further obtains a list of the participants of the meeting. For each of the non-leader participants ("non-leaders") that joins the meeting, the leader client device obtains the server signature and participant signature of the non-leader participant and verifies the authenticity of the non-leader participant. In some examples, the video conference provider posts the participant signature over the participant's long-term public key bound to the current meeting. Thus the leader can obtain the server posted signature to verify that the participant holding that long-term public key is authorized for the meeting, and then obtain the short-term public key for the participant and verifies that it was signed by that now verified long-term public key. In both steps, the leader also verifies the binding context. The binding helps to solve potential security issues thereby improving the security of the video conference. If the verification is successful, the leader client device computes an encrypted meeting key using the short-term public key of the non-leader and the short-term private key of the leader. The encrypted meeting key is then sent to the non-leader participant, for example, through the video conference provider.

When a non-leader joins the meeting, the client device associated with the non-leader ("non-leader client device") obtains the server signature and participant signature of the leader participant and verifies the authenticity of the leader by verifying the server signature and participant signature. The non-leader client device also obtains the meeting key encrypted for the non-leader. If the verification is successful, the non-leader client device performs decryption using its short-term private key to obtain the meeting key. The non-leader client device then uses the meeting key to encrypt and decrypt the content for the meeting.

In some examples, the leader client device updates the meeting key from time to time or whenever a new participant joins the meeting or an existing participant leaves the meeting. In those cases, the leader client device generates a new meeting key and distributes the new meeting key as described above.

In further examples, the leader client device maintains a leader participant list that is used to generate the participant list in a user interface of the meeting. The leader participant list is represented as a sequence of operations such as adding a user to the meeting, or noting when a user has left. The sequence of operations is stored in a link data structure. The leader client device generates a signature of the link and transmits the signature to the video conference provider for other participants to access and to generate the participant list for display.

The techniques disclosed herein for handling the joining and leaving of participants in videoconferencing enable the implementation of the end-to-end encryption of videoconferencing thereby improving the security of the videoconferencing process. By encrypting the meeting keys using only the keys of the participants, the video conference provider does not have access to the meeting keys and thereby cannot decrypt the meeting content. In addition, the encrypted meeting key for a particular non-leader participant is generated using the short-term public key of the particular participant. As a result, only this particular participant can decrypt the meeting key while the participant is in the current instance of the meeting. Further updating the meeting key upon joining and leaving of participants improves the security of the videoconferencing because doing so can prevent later joined participants from accessing the meeting content generated before they join and to prevent participants who left the meeting early from accessing the meeting content generated after they left.

This illustrative example is given to introduce the reader to the general subject matter discussed herein and the disclosure is not limited to this example. The following sections describe various additional non-limiting examples and examples of systems and methods for securely recording and retrieving encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
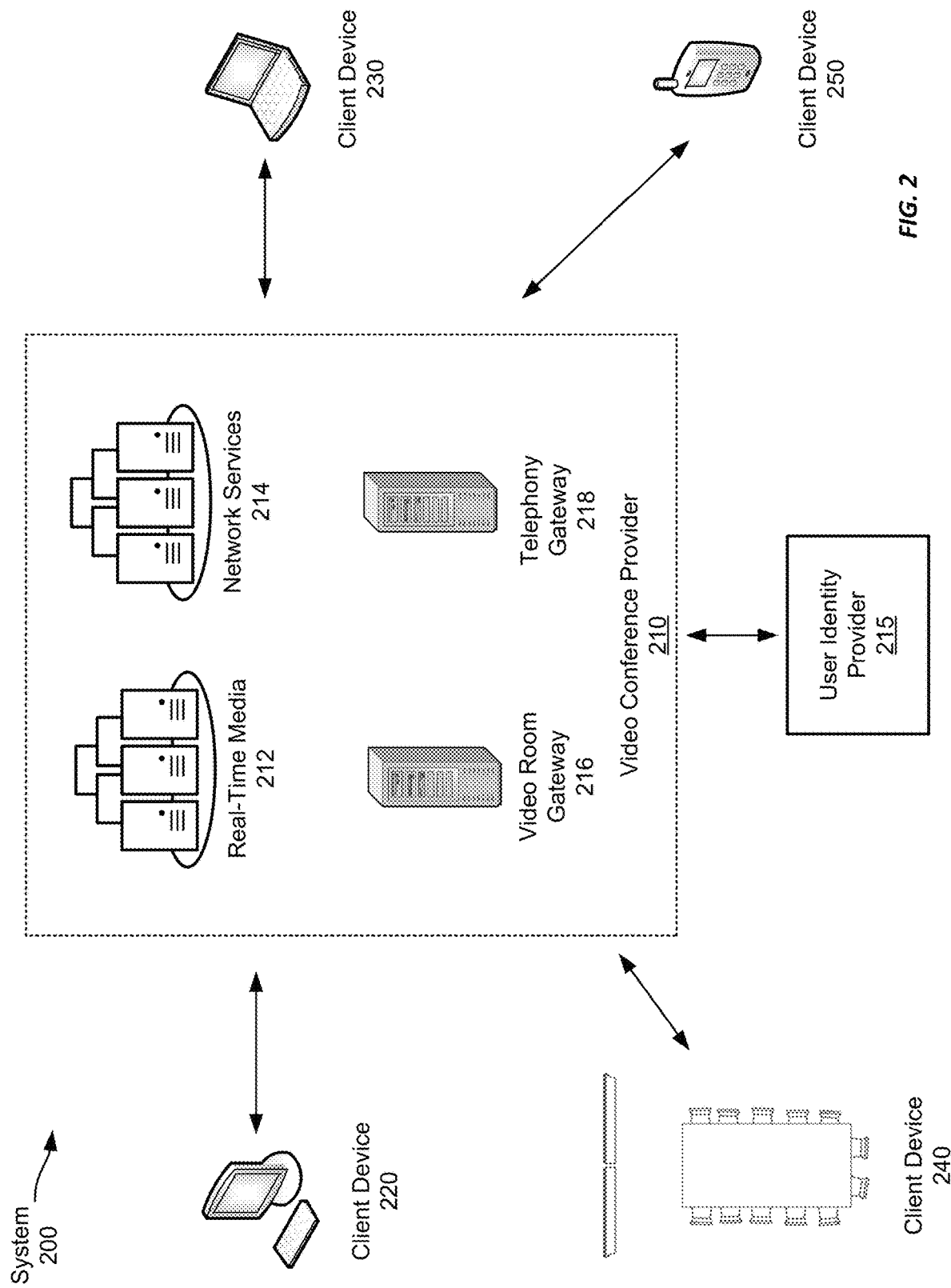
FIG. 2 shows an example system in which a video conference provider provides videoconferencing functionality to various client devices, according to certain aspects described herein.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that has audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information, etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
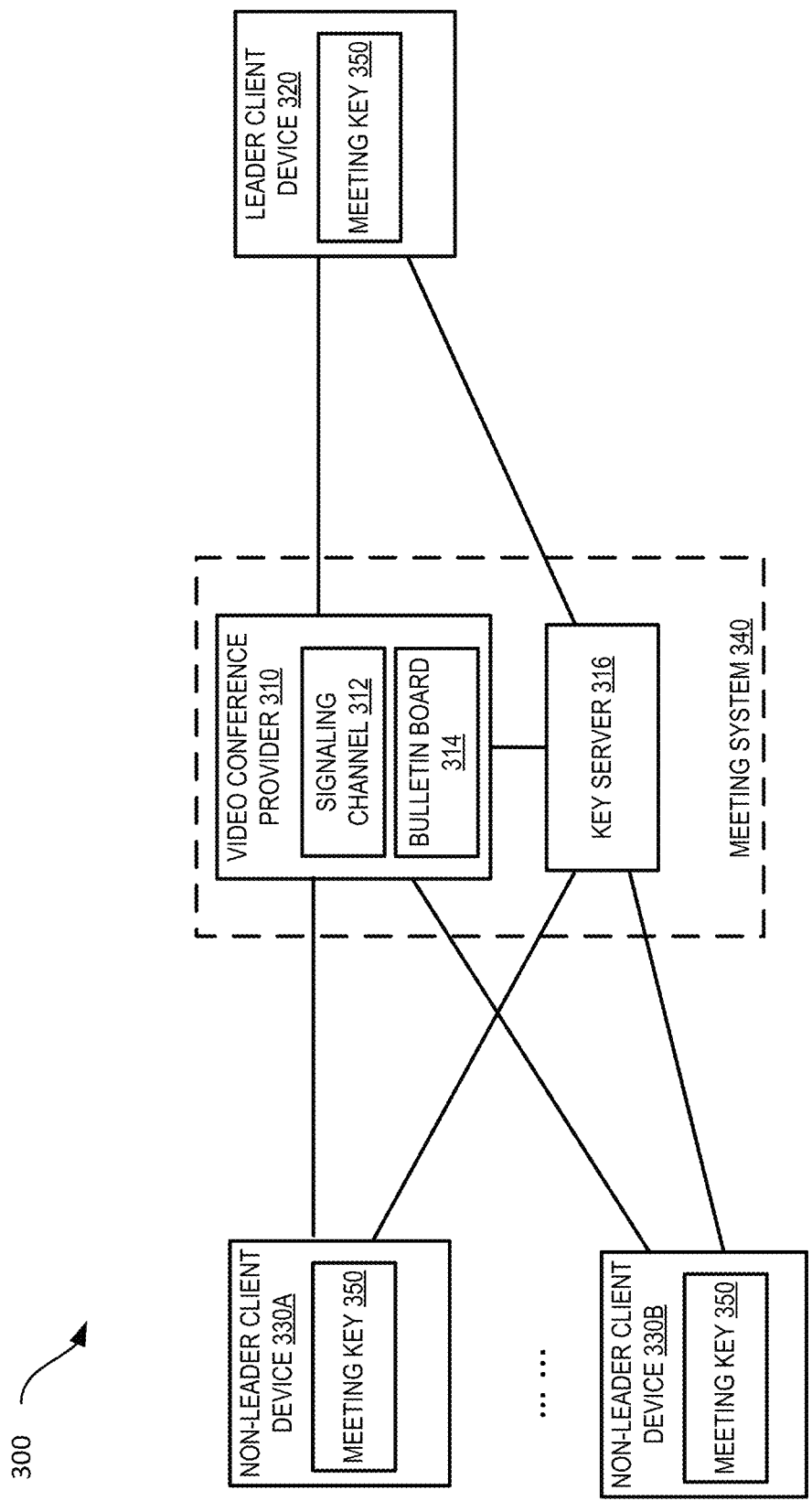
FIG. 3 shows an example of an operating environment for handling the joining and leaving of participants in videoconferencing with end-to-end encryption, according to certain aspects described herein.

Referring now to FIG. 3, FIG. 3 shows an example of an operating environment 300 for handling joining and leaving of participants in videoconferencing with end-to-end encryption, according to certain aspects described herein. The operating environment 300 includes a meeting system 340 configured to provide videoconferencing with end-to-end encryption to various client devices. The meeting system 340 includes a video conference provider 310, such as the video conference providers 110 and 210 described above with respect to FIGS. 1 and 2, and a key server 316. The key server 316 is configured to distribute cryptographic public keys generated by individual client devices. The key server 316 is also configured to bind keys to user accounts where possible, and may also support clients who do not have explicit identities with the video conference provider 310. The key server 316 may be implemented as a separate server or by the user identify provider 115 or 215 discussed above with respect to FIGS. 1 and 2.

In the example shown in FIG. 3, the video conference provider 310 is also configured to provide a signaling channel 312. The signaling channel 312 can be used to distribute cryptographic messages between participants in a meeting. For example, the signaling channel can be implemented as transport layer security (TLS)-tunnels over Transmission Control Protocol (TCP) terminated as the video conference provider 310. In addition to the signaling channel 312, the video conference provider 310 is also configured to provide a bulletin board 314 for each meeting. The meeting-specific bulletin board 314 can be used by participants to post cryptographic messages where all other participants of the meeting can see the messages. In some examples, the bulletin board 314 is implemented over the signaling channel 312. The video conference provider 310 clears the bulletin board 314 when the meeting ends.

The operating environment 300 further include various client devices, such as the client device 320 associated with a leader of the meeting (also referred to herein as "leader client device 320" or "leader device 320") and client devices 330A-B associated with non-leader participants (also referred to herein as "non-leader client devices 330" or "non-leader devices 330"). To facilitate the end-to-end encryption, each meeting requires an authorized participant to be present in the meeting who will be considered the leader of the meeting. The leader client device 320 associated with the leader (or more specifically the meeting client application executing on the leader client device 320) is configured for generating and distributing the shared meeting key, authorizing new meeting participants, and removing unwanted participants. The leader can be the host, a co-host, or another participant in the meeting. If the current leader leaves the meeting, the meeting system 340 can select a participant to be the replacement leader. Alternatively or additionally, the leader device of the current leader can appoint another participant to be the new leader before the current leader leaves the meeting. By allowing the leader to be a non-host participant, the meeting can be started without the host joining the meeting.

To generate and distribute the meeting key for the meeting, the leader client device 320 and the non-leader client device 330 verify each other, for example, using the participant signatures generated by the respective participant and server signatures generated by the key server 316. If the verification is successful, the leader client device 320 generates a meeting key 350 that is specific to the current instance of the meeting and is used by all participants of the meeting. To securely distribute the meeting key 350 to other participants, the leader client device 320 generates an encrypted version of the meeting key 350 for each participant using a public key provided by the participant, for example, through the signaling channel 312. As a result, the encrypted meeting keys for different participants are different. The leader client device 320 can distribute the encrypted meeting keys to the respective non-leader client devices 330, for example, by posting the encrypted meeting keys on the bulletin board 314. The leader client device 320 can also transmit the encrypted meeting keys to the respective non-leader client devices 330 using other ways. The non-leader client devices 330, after retrieving from the bulletin board 314 or otherwise receiving the respective encrypted meeting keys, can decrypt to obtain the meeting key 350. The non-leader client devices 330 further use the meeting key 350 to encrypt and decrypt the meeting data or meeting content received or to be transmitted during the meeting.

Whenever a new participant joins the meeting or an existing participant leaves the meeting, the leader client device 320 will generate a new meeting key 350 and distribute it as described above. The meeting key 350 is also updated periodically even if no participant is joining or leaving the meeting, such as every 10 seconds, 15 seconds, or 20 seconds. It should be appreciated that in some examples, to prevent generating and distributing new keys too rapidly, e.g., if multiple participants join in rapid succession, the leader client device 320 may use a minimum wait time between generating a new key, e.g., 5-15 seconds. Further, in one such example to prevent a later-joining participant from obtaining access to a meeting key that has been used for an extended period of time, and thus potentially accessing previously encrypted and stored meeting content, the leader client device 320 may restrict new participants to using meeting keys that have only been in use for less than a threshold amount of time, e.g., 15-30 seconds.

The leader client device 320 further maintains a leader participant list that is used to generate the participant list in the user interface of the meeting. The leader participant list is represented as a sequence of operations such as adding a user to the meeting, or noting when a user has left. The sequence of operations is stored in a link data structure. The leader client device 320 generates a signature of the link and transmits the signature to the video conference provider 310 (such as by posting it on the bulletin board 314) for other participants to access and to generate the participant list for display. Additional details about handling joining and leaving of participants in videoconferencing with end-to-end encryption are provided below with respect to FIGS. 4-6B.

Figure 4:
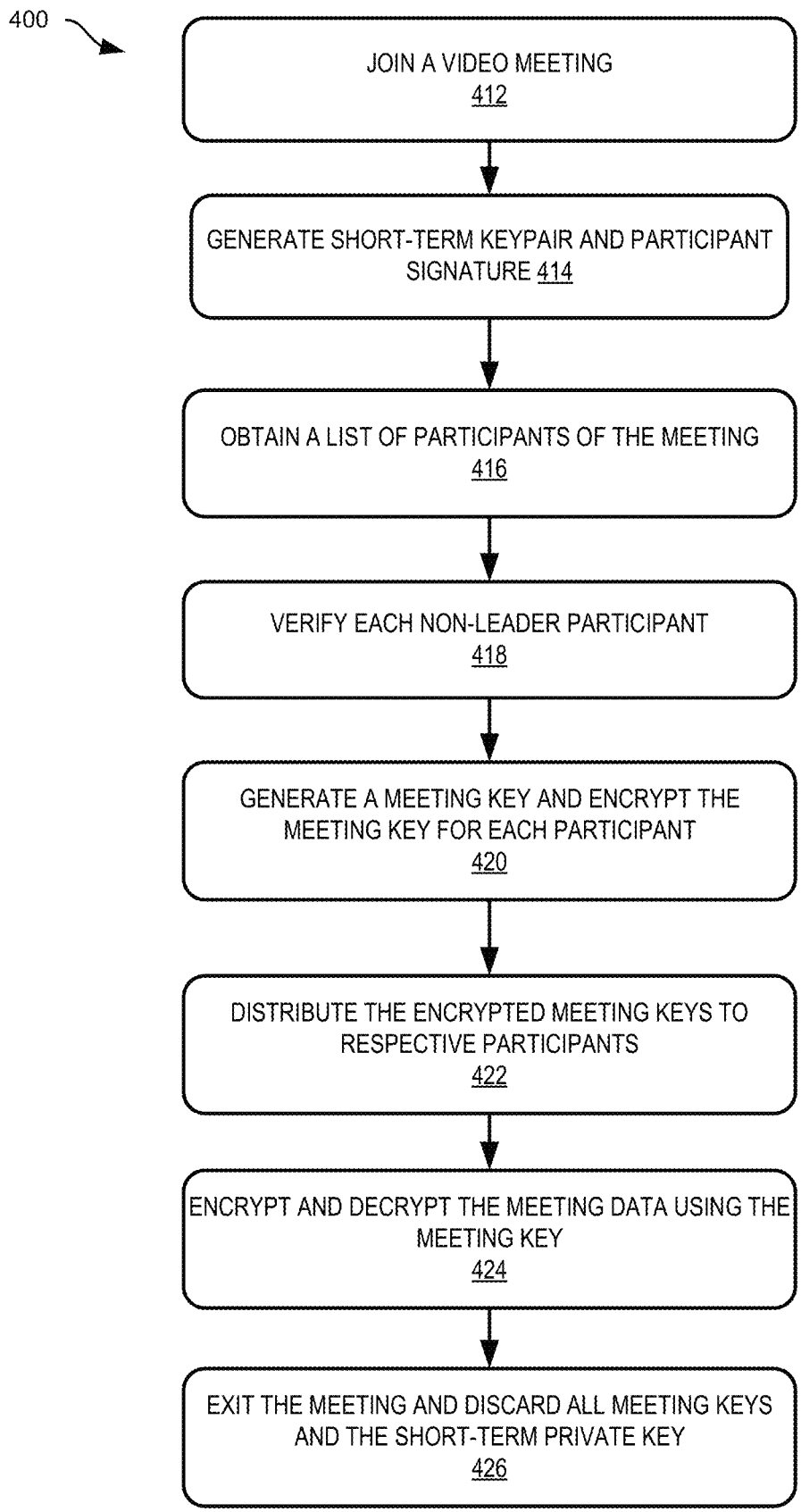
FIG. 4 shows an example of a process for a client device associated with a leader participant generating and distributing meeting keys for use in the end-to-end encryption of the video conferencing data, according to certain aspects described herein.

Referring now to FIG. 4, FIG. 4 shows an example of a process 400 for a leader client device 320 generating and distributing meeting keys 350 for use in the end-to-end encryption of video conferencing data, according to certain aspects described herein. The leader client device 320 can be configured to implement operations depicted in FIG. 4 by executing suitable program code (e.g., the meeting client application). The software or program code may be stored on a non-transitory storage medium (e.g., on a memory device). The process depicted in FIG. 4 and described below is intended to be illustrative and non-limiting. Although FIG. 4 depicts the various processing blocks occurring in a particular sequence or order, this is not intended to be limiting. In certain alternative embodiments, the blocks may be performed in some different order or some blocks may also be performed in parallel. For illustrative purposes, the process 400 is described with reference to certain examples depicted in the figures. Other implementations, however, are possible.

At block 412, the process 400 involves the leader client device 320 joining a video conference by connecting to a meeting server configured to handle streams for the video conference as described above with respect to FIGS. 1 and 2. At block 414, the process 400 involves the leader client device 320 generating a short-term keypair for the current instance of the meeting. The short-term keypair includes a short-term public key that can be shared with other participants and a short-term private key that is kept secret by the leader client device 320. The leader client device 320 may further use the short-term private key to generate a participant signature for use by other participants to verify the authenticity of the leader.

At block 416, the process 400 involves obtaining a list of the participants of the meeting. In some implementations, the leader client device 320 obtains the list of current participants from the video conference provider 310 which keeps a record of the participants who joined the meeting. Alternatively, in some examples, the leader client device 320 obtains the list of participants from a prior leader of the meeting, or it may construct a list of participants based on information created when the meeting was scheduled.

At block 418, the process 400 involves the leader client device 320 verifies each of the current non-leader participants of the meeting. The verification of a non-leader participant can be performed, for example, by verifying the participant signature generated by the non-leader client device 330 associated with the non-leader participant and a server signature generated by the key server 136 for the non-leader participant.

At block 420, the leader client device 320 generates a meeting key 350 for the current instance of the meeting. To distribute the meeting key 350, the leader client device 320 further encrypts the meeting key 350 for each of the non-leader participants whose authenticities have been successfully verified. The encrypted meeting keys are different for different participants and only the intended recipient of an encrypted meeting key can decrypt the message to obtain the meeting key 350 based on their respective short-term, generated keypairs.

At block 422, the leader client device 320 distributes the encrypted meeting keys to the respective non-leader participants. For example, the leader client device 320 can post the encrypted meeting keys on the bulletin board 314 for the non-leader client devices 330 to retrieve. Alternatively, or additionally, the leader client device 320 sends the encrypted meeting keys to the video conference provider 310 which then forwards the encrypted meeting keys to the respective non-leader client devices 330.

At block 424, the leader client device 320 uses the meeting key 350 to encrypt and decrypt the meeting data that are to be sent to other participants or received from other participants. The meeting data can include, but is not limited to, audio data, video data, and chat data including text and images. The leader client device 320 may repeat the one or more blocks of the process 400, such as blocks 418, 420, and 422 when a new non-leader participant joins the meeting, when an existing participant leaves the meeting, or when a pre-determined time period has passed. At block 424, the leader client device 320 exits the meeting and discards the short-term keypair and all the meeting keys generated while the leader was in the meeting.

Figure 5:
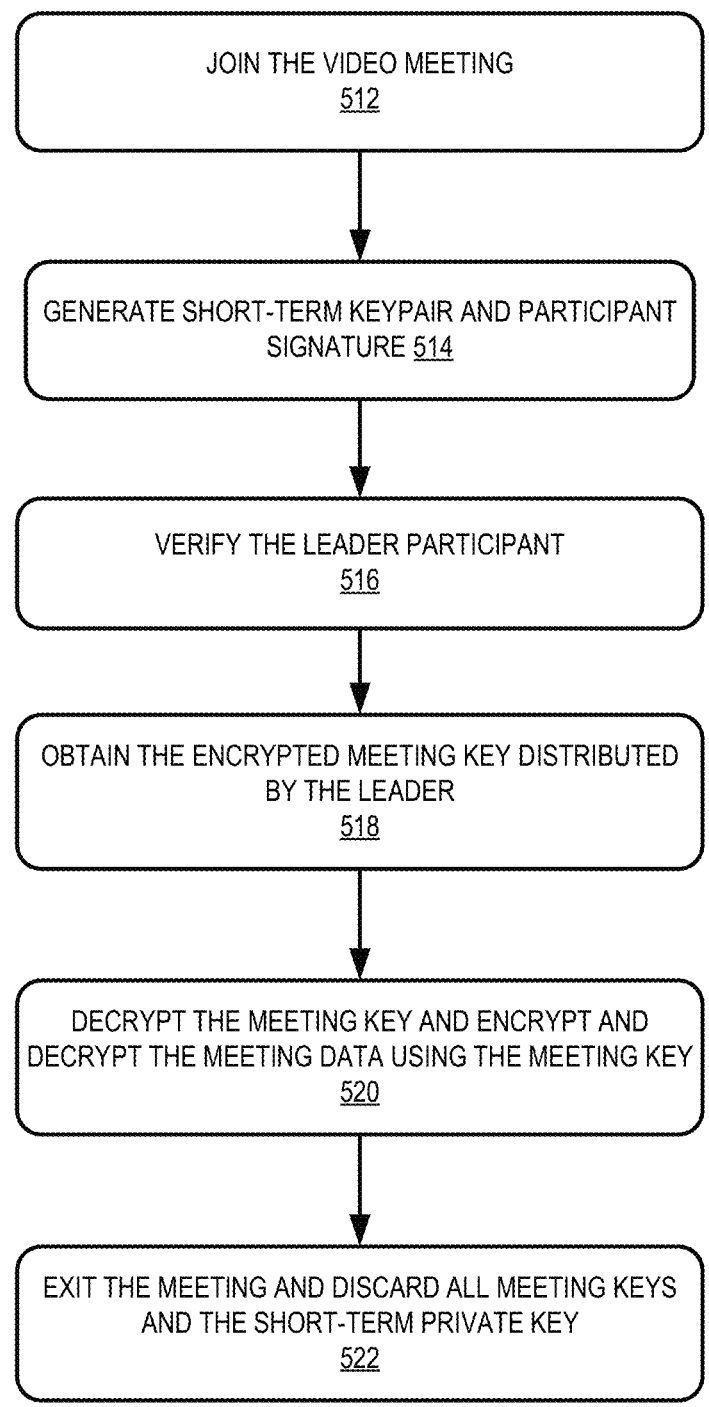
FIG. 5 shows an example of a process for a client device associated with a non-leader participant receiving and using meeting keys in the end-to-end encryption for video conferencing data, according to certain aspects described herein.

FIG. 5 shows an example of a process 500 for a non-leader device 330 receiving the meeting key 350 for use in the end-to-end encryption of video conferencing data, according to certain aspects described herein. A non-leader client device 330 can be configured to implement operations depicted in FIG. 5 by executing suitable program code (e.g., the meeting client application). The software or program code may be stored on a non-transitory storage medium (e.g., on a memory device). The process depicted in FIG. 5 and described below is intended to be illustrative and non-limiting. Although FIG. 5 depicts the various processing blocks occurring in a particular sequence or order, this is not intended to be limiting. In certain alternative embodiments, the blocks may be performed in some different order or some blocks may also be performed in parallel. For illustrative purposes, the process 500 is described with reference to certain examples depicted in the figures. Other implementations, however, are possible.

At block 512, the non-leader client device 330 joins the video conference by connecting to a meeting server of the meeting system 340 configured to handle streams for the video conference as described above with respect to FIGS. 1 and 2. At block 514, the process 500 involves the non-leader client device 330 generating a short-term keypair for the current instance of the meeting. The short-term keypair includes a short-term public key that can be shared with other participants and a short-term private key that is kept secret by the non-leader client device 320. The non-leader client device 330 may further use the short-term private key to generate a participant signature for use by other participants to verify its authenticity.

At block 516, the process 500 involves the non-leader client device 330 verifying the authenticity of the leader participant of the meeting. The verification is performed by verifying the participant signature generated by the leader and a server signature generated by the key server 136 for the leader, such as described above with respect to FIGS. 3 and 4 and described below with respect to blocks 620 and 660 of FIGS. 6A and 6B.

At block 518, the process 500 involves the non-leader client device 330 obtaining the encrypted meeting key distributed by the leader client device 320. If the leader client device 320 distributes the encrypted meeting key by posting it on the bulletin board 314, the non-leader client device 330 obtains the encrypted meeting key by retrieving it from the bulletin board 314. If the leader client device 320 sends the encrypted meeting keys to the video conference provider 310 which then forwards the encrypted meeting keys to the respective non-leader client devices 330, the non-leader client device 330 receives the encrypted meeting key from the video conference provider 310. The non-leader client device 330 may receive the encrypted meeting key through other ways depending on how the leader client device 320 distribute the meeting keys.

At block 520, the process 500 involves the non-leader client device 330 decrypting the meeting key 350. For example, if the leader client device 320 encrypt the meeting key 350 using the short-term public key generated by the non-leader client device 330, the meeting key 350 is decrypted by using the short-term private key in the same keypair as the short-term public key. Using the meeting key 350, the non-leader client device 330 encrypts and decrypts the meeting data that are to be sent to other participants or received from other participants.

When the leader client device 320 generates a new meeting key, the non-leader client device 330 can repeat blocks 518 and 520 to obtain the new meeting key and to encrypt and decrypt the meeting data with the new meeting key. If a new leader participant is selected for the meeting (e.g., the previous leader left the meeting), the non-leader client device 330 can verify the new leader participant in 516 and then repeat blocks 518 and 520 to obtain the meeting key generated by the new leader participants. At block 522, the process 500 involves the non-leader client device 330 exits the meeting and discards the short-term keypair and all the meeting keys received and used while the non-leader participant was in the meeting.

Figure 6A:
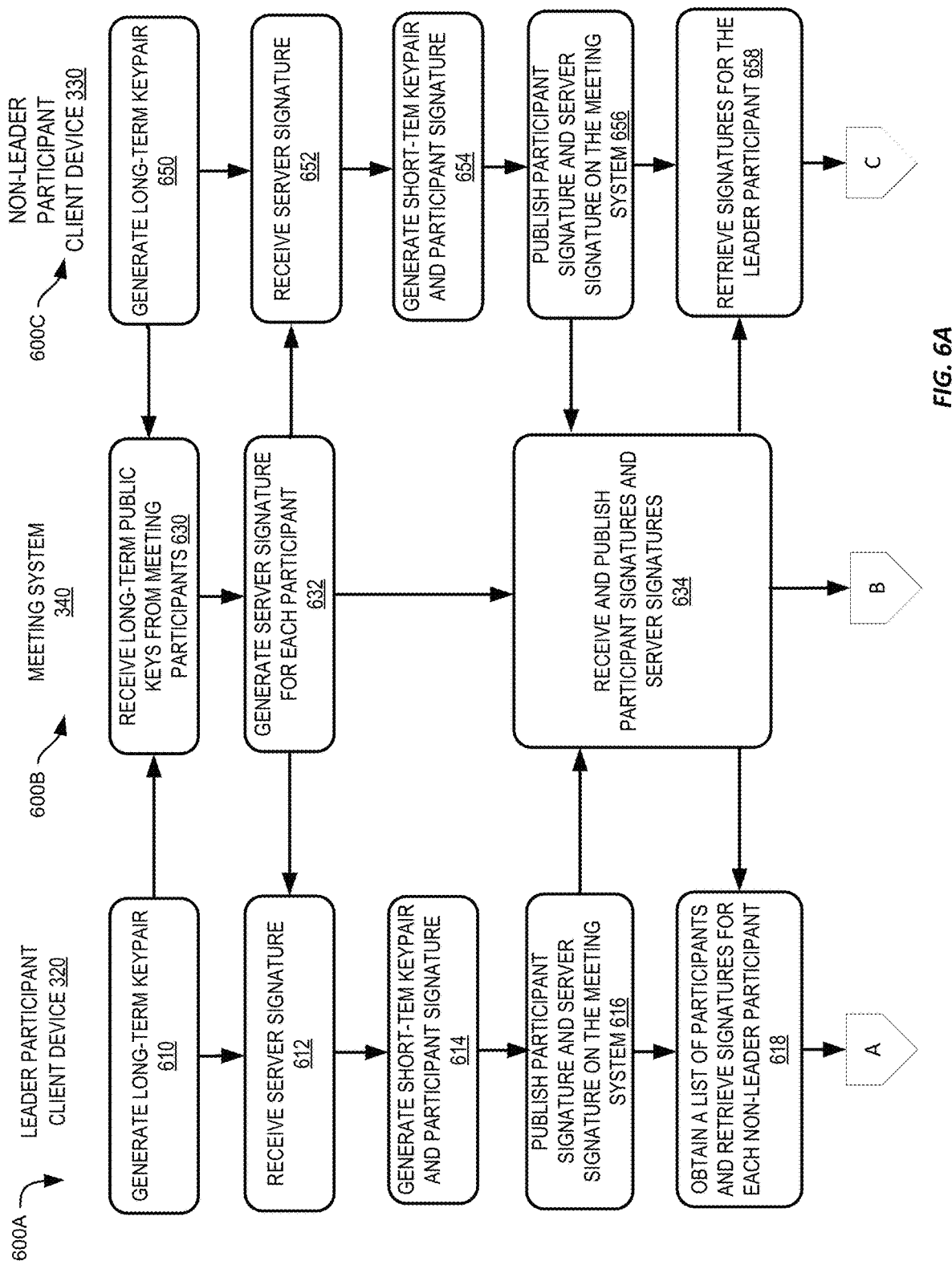
FIGS. 6A and 6B show examples of several processes of various devices for handling joining and leaving of participants in videoconferencing with end-to-end encryption, according to certain aspects described herein.
Figure 6B:
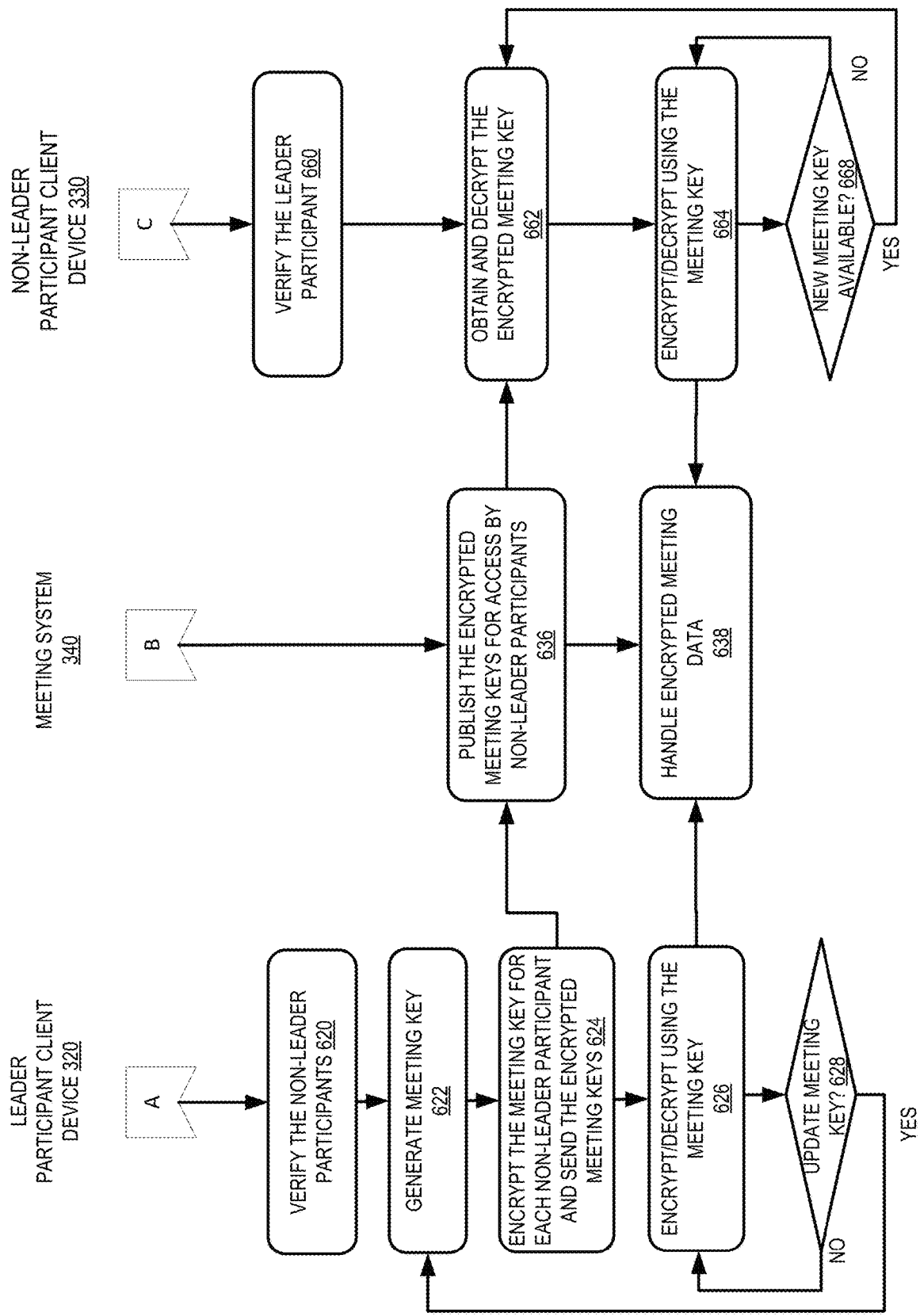

Referring now to FIGS. 6A and 6B, FIGS. 6A and 6B show a detailed example of handling joining and leaving of participants in videoconferencing with end-to-end encryption, according to some aspects described herein. FIGS. 6A and 6B include several flow diagrams that illustrate several processes 600A, 600B, and 600C. In particular, the process 600A illustrates aspects of a leader client device 320; the process 600B illustrates aspects of the meeting system 340; and the process 600C illustrates aspects of a non-leader client device 330, such as the non-leader client device 330A or the non-leader client device 330B. The processes 600A, 600B, and 600C are described together below. FIGS. 6A and 6B will be described with respect to the systems shown in FIG. 3; however any suitable system according to this disclosure may be employed, including any of the systems shown in FIGS. 1 and 2.

At block 610, the process 600A involves the leader client device 320 generating a long-term keypair that includes a long-term public key $IVK_l$ and a long-term private key $ISK_l$. Generating the long-term keypair may be performed by the leader client device 320 when the leader uses the leader client device 320 to sign up with the meeting system 340 or when the leader client device 320 first joins a meeting established by the meeting system 340. The leader client device 320 provides the long-term public key $IVK_l$ to the meeting system 340, such as the key server 316, along with other information signed using the long-term private key $ISK_l$ such as the user identifier (user ID) of the leader, the device identifier (device ID) of the leader client device 320. The leader client device 320 is further configured to store the long-term keypair and secure the long-term private key $ISK_l$ from being accessed by other devices. The long-term keypair is effective for any meeting joined by the leader (identified by the user ID of the leader) from the leader client device 320 (identified by the device ID of the leader client device 320).

Similarly, at block 650, the process 600C involves the non-leader client device 330 generating a long-term keypair that includes a long-term public key $IVK_i$ and a long-term private key $ISK_i$. Similar to block 610, generating the long-term keypair may be performed by the non-leader client device 330 when the non-leader participant uses the non-leader client device 330 to sign up with the meeting system 340 or when the non-leader client device 330 first joins a meeting established by the meeting system 340. The non-leader client device 330 provides the long-term public key $IVK_i$ to the meeting system 340, such as the key server 316, along with other information signed using the long-term private key $ISK_i$ such as the user ID of the non-leader, the device ID of the non-leader client device 330. The non-leader client device 330 is further configured to store the long-term keypair and secure the long-term private key $ISK_i$ from being accessed by other devices. The long-term keypair is effective for any meeting joined by the non-leader (identified by the user ID) from the non-leader client device 330 (identified by the device ID).

At block 630, the meeting system 340 (e.g., the key server 316) receives the long-term public keys from the leader client device 320 and the non-leader client device 330. At block 640, the meeting system 340 (e.g., the key server 316) generates a server signature for each participant, leader or non-leader, when the participant joins the meeting. The server signature indicates that the participant's user ID, device ID, and the long-term public key is authorized. For example, the key server 316 generates the server signature for participant k by cryptographically signing $Sig_{Server}^k$ over a meeting instance ID (meeting UUID), the user ID of participant, the device ID (of the leader client device 320 or the non-leader client device 330) and the long-term public key $IVK_k$. Here, k=l or i. In some examples, the server signature is generated using a private server key and is verifiable using a public server key in the same key pair as the private server key.

In some examples, certificate pinning is used to strengthen the security of the server signature. Each of the non-leader client device 330 and leader client device 320 (or more specifically the meeting client application installed on the respective client devices) is configured with a root certificate, e.g., from a trusted certificate provider, and these client devices are configured to only trust certificates authorized for a specific domain via a certificate chain originating from the trusted certificate provider root. Hardware Security Modules (HSMs) are used to manage keys for an internal intermediate certificate authentication (CA), which will in turn attest to the servers' signing keys. Server keys are valid for a period of time, such as three days, a week, or two weeks, and are rotated periodically, such as daily or weekly. In order to detect certificate revocation in the event of CA or server compromise, the client devices can require stapled Online Certificate Status Protocol (OCSP) responses on the intermediate certificates they receive. These signatures help protect against man-in-the-middle attacks injecting users into the meeting.

The meeting system 340 (e.g., the key server 316) sends the generated server signature to the corresponding participant (leader or non-leader). At block 612, the process 600A involves the leader client device 320 receiving the server signature generated for it, $\text{Sig}_{Server}^{l}$. At block 652, the process 600C involves the non-leader client device 330 receiving the server signature generated for it, $\text{Sig}_{Server}^{i}$.

At block 614, the leader client device 320 generates a participant key for the current instance of the meeting which is a short-term keypair that includes a short-term public key $pk_l$ and a short-term private key $sk_l$. The participant key is generated when the leader joins the meeting, whether before or after the meeting starts. The leader client device 320 stores the short-term keypair for the duration of the current instance of the meeting.

The leader client device 320 further generates a participant signature $\text{Sig}_l$ that can be used by other participants to verify the authenticity of the leader participant. In some examples, the leader client device 320 generates the participant signature $\text{Sig}_l$ based on the short-term keypair and long-term keypair of the leader participant and information associated with the leader participant and the meeting. For example, the leader client device 320 obtains a meeting instance identifier identifying the current instance of the meeting meetingUUID, for example, from the video conference provider 310. In an example, the meetingUUID is server-generated per-meeting-instance randomness that the individual participants cannot control. Based on the information of the meeting and the leader participant, the leader client device 320 generates a binding $\text{Binding}_l$ as follows:

$$\text{Binding}_l \leftarrow (\text{meetingID}\|\text{meetingUUID}\|\text{userID}_l\|\text{deviceID}_l\|IVK_l\|pk_l). \quad (1)$$

Here, meetingID is the meeting identifier that uniquely identifies the meeting. A meeting can be ended and then later started. The meetingID can refer to a standing or repeating meeting. $\text{userID}_l$ is the user identifier of the leader participant; the $\text{deviceID}_l$ is the device identifier of the leader client device 320.

The leader client device 320 can cryptographically sign the $\text{Binding}_l$ and a context string using the long-term private key $ISK_l$ of the leader participant to generate the participant signature $\text{Sig}_l$, such as $$\text{Sig}_l = \text{Sign}(ISK_l, \text{Context}, \text{Binding}_l). \quad (2)$$

Here, Sign(Key, Context, M) is a function taking as input a context string Context and a message M and outputs a cryptographic signature Sig. The context string Context is a constant string. For example, Sign( ) can be a function for outputting a signature over SHA256(Context)||SHA256(M), where SHA256 is a cryptographic hash function with has values that are 256 bits. It should be understood that the signing function Sign( ) and the hash function SHA256 described above are examples only and should not be constructed as limiting. Other signing functions and hash functions can be utilized.

At block 616, the leader client device 320 publishes, or otherwise made available for access, its participant signature $\text{Sig}_l$ and server signature $\text{Sig}_{Server}^{l}$. In some examples, the leader client device 320 publishes the participant signature $\text{Sig}_l$ and server signature $\text{Sig}_{Server}^{i}$ on the meeting system 340, such as on the bulletin board 314 or through other mechanisms where the signatures can be accessed by other participants.

Blocks 654 and 656 of the process 600C involve similar operations as blocks 614 and 616 of the process 600A. At block 654, the non-leader client device 330 generates a short-term participant keypair for the current instance of the meeting which includes a short-term public key $pk_i$ and a short-term private key $sk_i$. The participant key is generated when the non-leader participant joins the meeting, whether before or after the meeting starts. The non-leader client device 330 stores the short-term keypair for the duration of the current instance of the meeting. The non-leader client device 330 further generates a participant signature $\text{Sig}_i$ that can be used by other participants to verify the authenticity of the non-leader participant. The participant signature $\text{Sig}_i$ can be generated based on the short-term keypair and long-term keypair of the non-leader participant and information associated with the non-leader participant and the meeting in a way similar to generating the participant signature $\text{Sig}_l$ described above by replacing the keys and other information of the leader participant with that of the non-leader participant, including $\text{userID}_i$, $\text{deviceID}_i$, $IVK_i$, and $pk_i$. At block 656, the non-leader client device 330 publishes the participant signature $\text{Sig}_i$ and the server signature $\text{Sig}_{Server}^{i}$ in a way similar to the leader client device 320 publishing the participant signature $\text{Sig}_l$ and the server signature $\text{Sig}_{Server}^{l}$.

At block 634, the meeting system 340 (e.g., the video conference provider 310) receives the participant signatures and the server signatures from the leader participant and non-leader participants. The meeting system 340 further publishes these signatures or otherwise makes them available for access by the participants of the current instance of the meeting, such as through the bulletin board 314.

At block 618, the leader client device 320 obtains a list of participants of the meeting, for example, from the video conference provider 310 of the meeting system 340. For each of the non-leader participants, the leader client device 320 further retrieves the participant signature $\text{Sig}_i$ and the server signature $\text{Sig}_{Server}^{i}$ of the non-leader participant from the video conference provider 310, e.g., via the bulletin board 314 or other mechanisms provided by the video conference provider 310 for publishing the signatures. At block 620, the leader client device 320 verifies the authenticity of each of the non-leader participants based on the participant signature $\text{Sig}_i$ and the server signature $\text{Sig}_{Server}^{i}$ of the non-leader participant. For example, the leader client device 320 retrieves $\text{Sig}_i$ and $\text{Sig}_{Server}^{i}$ from the meeting system 340 (e.g., from the bulletin board 314 provided by the video conference provider 310). The leader client device 320 further retrieves the short-term public key $pk_i$ of the non-leader participant (e.g., from the bulletin board 314) and retrieves the long-term public key $IVK_i$ (e.g., from the key server 316).

The leader client device 320 verifies the server signature $\text{Sig}_{Server}^{i}$ by using the public key provided by the key server 316. The leader client device 320 further calculates the $\text{Binding}_i$ as $$\text{Binding}_i \leftarrow (\text{meetingID}\|\text{meetingUUID}\|\text{userID}_i\|\text{deviceID}_i\|IVK_i\|pk_i). \quad (3)$$

The leader client device 320 then verifies the participant signature $\text{Sig}_i$ using the $\text{Binding}_i$, $IVK_i$, the constant context string Context, and $\text{Sig}_i$. If the verification fails, the leader client device 320, the leader client device 320 stops the further processing for the non-leader participant, such as by removing the non-leader participant from a list of valid participants.

At block 622, the leader client device 320 generates a meeting key 350 for use by the participants of the current meeting to encrypt and decrypt the meeting data. In some examples, the meeting key 350 is generated using a secure random or pseudo-random number generator. The meeting key 350 may be a symmetric seed key for the meeting and can take a size that is secure for the videoconferencing, such as 32-byte.

At block 624, the leader client device 320 encrypts the meeting key 350 for each non-leader participant that has been successfully authenticated and sends the encrypted meeting key to the corresponding non-leader client device 330. For example, the leader client device 320 computes, for non-leader participant i, a metadata $$\text{Meta}_i \leftarrow (\text{meetingID}\|\text{meetingUUID}\|\text{userID}_l\|\text{userID}_i). \quad (4)$$

The leader client device 320 then generates the encrypted meeting key $C_i$ for non-leader participant i based on the short-term public key $pk_i$ of the non-leader participant, the short-term private key $sk_l$ of the leader participant, the $\text{Meta}_i$, constant context strings $\text{Context}_{MK}$, and the meeting key MK. That is $$C_i = Enc(sk_l; pk_i; \text{Context}_{MK}, \text{Meta}_i, MK). \quad (5)$$

The leader client device 320 sends the encrypted meeting key $C_i$ to the meeting system 340 (e.g., the bulletin board 314).

At block 636, the meeting system 340 (e.g., the video conference provider 310) receives the encrypted meeting keys for various participants and makes these encrypted meeting keys accessible by the participants of the meeting.

The non-leader client device 330, before retrieving the encrypted meeting key, retrieves participant signatures for the leader participant at block 658 and verifies the leader participant based on the participant signature $\text{Sig}_l$ and server signature $\text{Sig}_{Server}^l$ at block 660. Retrieving the signatures of the leader participant can be performed by accessing the bulletin board 314 or other mechanisms provided by the video conference provider 310 for publishing the participant signature $\text{Sig}_l$ and server signature $\text{Sig}_{Server}^l$. The verification of the leader participant is similar to the process of verification of the non-leader participant described above with respect to block 620.

After the non-leader client device 330 successfully verifies the leader participant, the non-leader client device 330 obtains the encrypted meeting key $C_i$ from the meeting system 340 and decrypts it to obtain the meeting key 350 at block 662. Continuing the example described above with respect to block 624, the decryption is performed by the non-leader client device 330 calculating $\text{Meta}_i$ and decrypts the meeting key using a description function Dec( ) corresponding to the encryption function Enc( ) and based on the short-term private key $sk_i$ and short-term public key $pk_l$. That is $$MK = Dec(sk_i; pk_l; \text{Context}_{MK}, \text{Meta}_i, C_i). \quad (6)$$

Once all the participants have access to the shared meeting key MK, the meeting data can be encrypted and decrypted accordingly. At block 626 and block 664, the leader client device 320 and the non-leader client device 330 starts to encrypt and decrypt the meeting data using the meeting key, respectively. The meeting data include video data, audio data, or chat data (e.g., text or image). The meeting system 340 handles these encrypted meeting data at block 638. In some examples, each client device (the leader client device 320 and the non-leader client device 330) uses the meeting key MK to derive different sub-keys for different message types (e.g., chat, audio, video). In these examples, different types of data are encrypted and decrypted using different sub-keys.

In the above description, the public key encryption and signing can be implemented based on Diffie-Hellman over Curve25519 and Edwards-curve Digital Signature Algorithm (EdDSA) over Ed25519. Curve25519 is an elliptic curve offering 128 bits of security (256 bits key size) and designed for use with the elliptic curve Diffie-Hellman (ECDH) key agreement scheme. Ed25519 is the EdDSA signature scheme using SHA-512 (SHA-2) and Curve25519. The participant key can be generated using any keypair generation algorithm, such as algorithms based on keys derived using HMAC-based Extract-and-Expand Key Derivation Function (HKDF). The different sub-keys for different message types can be derived using an additional HKDF step mixing in a distinct flag for the message type and also the meetingID, the meetingUUID, and the ID of the message sender.

At block 628, the leader client device 320 determines whether the meeting key should be updated. The determination can be made based on determining that a condition for updating the meeting key is satisfied. The condition can be an existing participant has left the meeting, a new participant has joined the meeting, or a specified time period (e.g., 15 seconds, 30 seconds) has passed since the last meeting key generation. If the condition has not been satisfied, the leader client device 320 continues to use the current meeting key for communication. If the condition for updating the meeting key has been satisfied, the leader client device 320 generates a new meeting key as described above with respect to block 622. The leader client device 320 further updates the list of participants to include new participants who joined the meeting and remove participants that have left the meeting. The leader client device 320 encrypts and distributes the new meeting key for each of the participants as described above with respect to block 624.

At block 668, the non-leader client device 330 determines whether there is a new meeting key available. For example, the non-leader client device 330 may receive a notification when the leader client device 320 posts the new meeting key on the meeting system 340. If there is no new meeting key, the non-leader client device 330 continues to use the current meeting key to encrypt and decrypt the meeting data. If the new meeting key is available, the non-leader client device 330 obtains and decrypts the new meeting key as described above with respect to block 662. In some implementations, the non-leader client device 330 is configured to wait for a pre-determined period of time (e.g., a few seconds) before using the new meeting key for encryption and decryption. This can ensure that all participants have obtained the new meeting key and transitioned over.

In some examples, the leader client device 320 further maintains a "leader participant list" (LPL) tabulating all the participants in the meeting. For each participant currently in the meeting, the LPL keeps track of a hash over information associated with the participants. For example, the information includes the $IVK_i$, $pk_i$, userID, and deviceID of the participants as well as their display names. For users who have left the meeting, the LPL tracks the information of the users such as their $VK_i$, $pk_i$, userID, deviceID, and display names.

In some implementations, the LPL is used to drive the participant list in the user interface shown on the leader client device 320 and respective non-leader client device 330, which records both users currently in the meeting and those who have left. In certain implementations, the meeting system 340 can provide the display names for people who are currently participating in the meeting, and the LPL can provide the display names for people who have left the meeting. In other implementations, the LPL provides the display names for people who are currently in the meeting and who have left the meeting.

In examples, the LPL is represented as a sequence of operations such as adding a user to the meeting, or noting when a user has left. Every time there is such an operation, the leader increments a counter v representing the total number of operations and cryptographically signs over a data structure (called a link) containing the counter, the hash of the previous link, and the current operation. If there are more than a threshold number of links (e.g., 20 links) in the chain, the leader can coalesce all of the previous links into a smaller number of links. The old links are then deleted in order to save space.

Leaders post a signature over the latest link to the bulletin board 314 whenever membership changes, and broadcast it over the signaling channel at designated heartbeat intervals.

$$Sig_{LPL}=Sign(ISK_l, Context_{LPL}, (Binding_i \| SHA256 (LPL_v) \| v \| t \| mkSeqNum)),$$

where $Context_{LPL}$ is a constant context string for LPL, t increments on every sending operation of the signature, v increments whenever the LPL changes, and mkSeqNum increments on every meeting key generation.

In this way, the sequence of operations is replayed in the bulletin board 314. Based on the sequence of operations, the client devices of other participants can reconstruct the current list of participants and know for which participants the meeting key are to be re-generated if the leader drops out and one of the participants becomes the new leader.

In cases when the meeting system 340 is comprised, the compromised servers might try to withhold updates made by the leader client device 320, to hide when bad actors are kicked out. To handle such scenarios, the leader client device 320 is also configured to send a low bandwidth "heartbeat" over the signaling channel. Heartbeats can be configured to go out at a minimum frequency (e.g., at least every 10 seconds). All non-leader client devices 330 observe and verify these heartbeats, and if they fail to receive ten heartbeats in a row, they should drop out of the meeting.

When a leader does drop out of a meeting, the meeting system 340 can pick a new leader arbitrarily, or it can select an existing co-host or a participant designated as a new leader by the prior leader, and sends a signal to participants indicating that the leader has changed. The new leader then coalesces the chain as described above, and other participants verify that the new leader is present in the new LPL. For users in the meeting, clients remember the mapping between (userID, deviceID) and the hash over the corresponding $Binding_i$, and ensure that the hash remains stable across new links and leader changes. If a user leaves the meeting, it is enforced that any user who rejoins with the same userID and deviceID must have the same $IVK_i$, but not necessarily the same $pk_i$. These guarantees persist only over the course of a single meeting.

In some examples, a video conference is established with multiple sub-meetings, such as the breakout rooms described above with respect to FIGS. 1 and 2. Each sub-meeting includes participants and can be configured with end-to-end encryption. To implement the end-to-end encryption for the sub-meetings, the leader for each sub-meeting can be selected among the sub-meeting participants. For example, the leader for a sub-meeting is selected as the participant who satisfies certain conditions (e.g., having the lowest userID among the participants in the sub-meeting). In another example, the meeting system 340 (e.g., the video conference provider 310) selects one of the participants in the sub-meeting to be the leader. In these examples, the client device associated with the leader participant can generate and distribute the meeting key to client devices associated with the non-leader participants as described above with respect to FIGS. 3-4B.

In a further example, the participants of a sub-meeting can obtain the meeting key for the sub-meeting through the main meeting. In some configurations, each client device is still connected to the main meeting after joining a sub-meeting. In that case, the leader of the main meeting (or another participant, such as the host) can generate and distribute the meeting key for the sub-meeting through the main meeting as described above. Other ways for generating and distributing meeting keys for a sub-meeting can also be implemented.

Figure 7:
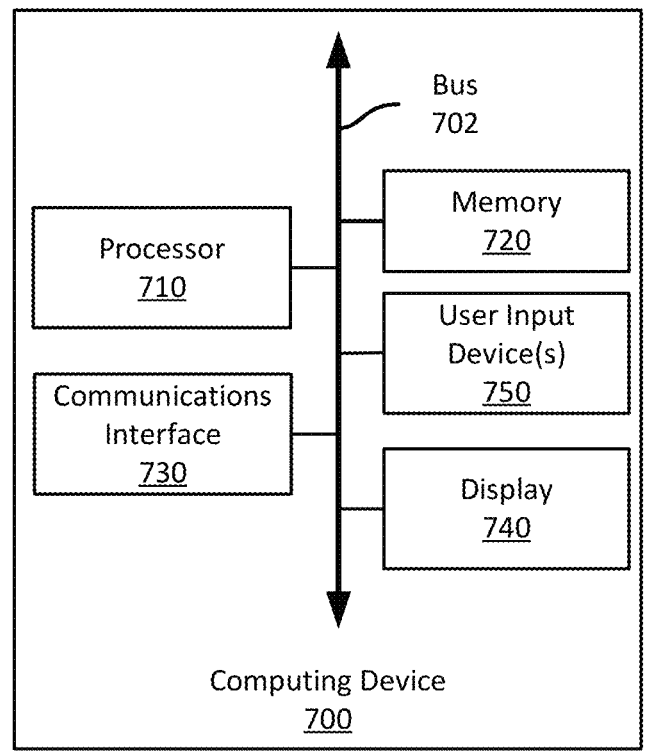
FIG. 7 shows an example computing device suitable for implementing aspects of the techniques and technologies described herein.

Referring now to FIG. 7, FIG. 7 shows an example computing device 700 suitable for implementing aspects of the techniques and technologies described herein. The example computing device 700 includes a processor 710 which is in communication with the memory 720 and other components of the computing device 700 using one or more communications buses 702. The processor 710 is configured to execute processor-executable instructions stored in the memory 720 to execute the leader client device 320, the non-leader client device 330, the video conference provider 310, the key server 316, or a portion thereof according to this disclosure or to perform one or more methods for handling joining and leaving of participants in videoconferencing with end-to-end encryption, such as part or all of the example processes 400, 500, 600A, and 600B described above with respect to FIGS. 4-6B. The computing device, in this example, also includes one or more user input devices 750, such as a keyboard, mouse, touchscreen, video capture device, microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   joining, by a client device associated with a leader of a video meeting, the video meeting by connecting to a meeting server of a meeting system configured to handle the video meeting;
   generating a short-term encryption keypair for the video meeting comprising a short-term public key and a short-term private key;
   generating a meeting key for the video meeting;
   obtaining a list of participants of the video meeting;
   for each participant in the list of participants,
      obtaining a long-term public key associated with the participant from a key server;
      obtaining a cryptographic signature of the participant from the meeting system;
      verifying the cryptographic signature of the participant based on the long-term public key associated with the participant, a short-term public key associated with the participant, the cryptographic signature of the participant, participant information of the participant, and meeting information of the video meeting;
      in response to the verification being successful, encrypting the meeting key for the participant using the short-term private key, the short-term public key associated with the participant, a meeting identifier, and a user identifier identifying the participant; and
      publishing the encrypted meeting key for the participant on the meeting system;
   receiving meeting data from each of the participants encrypted based on the meeting key; and
   decrypting the meeting data for presentation based on the meeting key.

2. The method of claim 1, further comprising:
   generating a new meeting key based on a condition for generating the new meeting key is satisfied;
   updating the list of participants of the video meeting; and
   for each participant in the updated list of participants,
      encrypting the new meeting key for the participant using the short-term private key of the leader, the short-term public key associated with the participant, the meeting identifier, and the user identifier identifying the participant, and
      causing the encrypted new meeting key to be accessible by a client device associated with the participant.

3. The method of claim 2, wherein the condition for generating a new meeting key comprises one or more of:
   a participant joins the video meeting;
   a participant leaves the video meeting; or
   a pre-determined time period has passed since the meeting key is generated.

4. The method of claim 2, wherein the meeting key and the new meeting key are independently generated.

5. The method of claim 1, wherein the leader is one of:
   a host of the video meeting;
   a co-host of the video meeting; or
   a participant of the video meeting.

6. The method of claim 1, further comprising:
   generating a long-term keypair comprising a long-term public key and a long-term private key;
   providing the long-term public key to the meeting system;
   receiving a server cryptographic signature from the meeting system, the server cryptographic signature being generated based on the meeting identifier, a user identifier of the leader, and the long-term public key of the leader;
   computing a participant cryptographic signature for the leader using the long-term private key based on data comprising the long-term public key, the short-term public key, the meeting identifier, and the user identifier of the leader; and
   causing the server cryptographic signature and the participant cryptographic signature accessible by other participants of the video meeting for verifying an authenticity of the leader.

7. The method of claim 1, wherein the meeting information comprises one or more of a meeting identifier identifying the video meeting, a meeting instance identifier identifying an instance of the video meeting, and wherein the participant information comprises one or more of a participant identifier identifying the participant, or a device identifier identifying the client device associated with the participant.

8. The method of claim 1, wherein the meeting key is generated using a pseudo-random number generator.

9. The method of claim 1, wherein the meeting data comprises one or more of audio data, video data, or text.

10. A method comprising:
joining, by a client device associated with a non-leader participant of a video meeting, the video meeting by connecting to a meeting system configured to handle the video meeting;
generating a short-term encryption keypair comprising a short-term public key and a short-term private key;
obtaining a long-term public key of a leader participant of the video meeting from the meeting system;
obtaining a participant cryptographic signature of the leader participant and a short-term public key of the leader participant from the meeting system;
verifying the participant cryptographic signature of the leader participant based on a long-term public key of the leader participant, the short-term public key of the leader participant obtained from the meeting system, the participant cryptographic signature of the leader participant, participant information of the leader participant and meeting information of the video meeting;
obtaining an encrypted meeting key for the non-leader participant from the meeting system;
decrypting the meeting key using the short-term private key of the non-leader participant, the short-term public key of the leader participant, the meeting information, a participant identifier of the leader participant, and a participant identifier of the non-leader participant;
encrypting meeting data based on the meeting key; and
transmitting the meeting data to the meeting system.

11. The method of claim 10, further comprising:
determining that a new meeting key is available;
decrypting the new meeting key using the short-term private key of the non-leader participant, the short-term public key of the leader participant, the meeting information, the participant identifier of the leader participant, and the participant identifier of the non-leader participant;
waiting for a pre-determined period of time; and
encrypting meeting data based on the new meeting key.

12. The method of claim 11, wherein the meeting key and the new meeting key are independently generated.

13. The method of claim 10, further comprising:
generating a long-term keypair comprising a long-term public key and a long-term private key;
providing the long-term public key to the meeting system;
receiving a server cryptographic signature from the meeting system, the server cryptographic signature being generated based on a meeting identifier, the participant identifier of the non-leader participant, and the long-term public key of the non-leader participant;
computing a participant cryptographic signature for the non-leader participant using the short-term public key of the non-leader participant based on the long-term public key of the non-leader participant, the short-term public key of the non-leader participant, and participant information of the non-leader participant and the meeting information of the video meeting; and
causing the server cryptographic signature and the participant cryptographic signature accessible by other participants of the video meeting for verifying an authenticity of the non-leader participant.

14. The method of claim 10, wherein the meeting information comprises one or more of a meeting ID identifying the video meeting, a meeting instance identifier identifying an instance of the video meeting, and wherein the participant information comprises one or more of a participant identifier identifying the leader participant, or a device identifier identifying the client device associated with the leader participant.

15. The method of claim 10, wherein the meeting data comprises one or more of audio data, video data, or text.

16. A system associated with a leader of a video meeting, comprising:
a non-transitory computer-readable medium; and
a processor communicatively coupled to the non-transitory computer-readable medium, the processor configured to execute processor-executable instructions stored in the non-transitory computer-readable medium to perform operations comprising:
generating a short-term encryption keypair for the video meeting comprising a short-term public key and a short-term private key;
generating a meeting key for the video meeting;
obtaining a list of participants of the video meeting;
for each participant in the list of participants,
obtaining a long-term public key associated with the participant from a key server;
obtaining a cryptographic signature of the participant from a meeting system configured for managing the video meeting;
verifying the cryptographic signature of the participant based on the long-term public key associated with the participant, a short-term public key associated with the participant, the cryptographic signature of the participant, participant information of the participant, and meeting information of the video meeting;
in response to the verification being successful, encrypting the meeting key for the participant using the short-term private key, the short-term public key associated with the participant, a meeting identifier, and a user identifier identifying the participant; and
publishing the encrypted meeting key for the participant on the meeting system;
receiving meeting data from each of the participants encrypted based on the meeting key; and
decrypting the meeting data for presentation based on the meeting key.

17. The system of claim 16, wherein the operations further comprise:
generating a new meeting key based on a condition for generating the new meeting key is satisfied;
updating the list of participants of the video meeting; and
for each participant in the updated list of participants,
encrypting the new meeting key for the participant using the short-term private key of the leader, the short-term public key associated with the participant, the meeting identifier, and the user identifier identifying the participant, and
causing the encrypted new meeting key to be accessible by a client device associated with the participant.

18. The system of claim 17, wherein the condition for generating a new meeting key comprises one or more of:
a participant joins the video meeting;
a participant leaves the video meeting; or
a pre-determined time period has passed since the meeting key is generated.

19. The system of claim 17, wherein the meeting key and the new meeting key are independently generated.

20. The system of claim 16, wherein the operations further comprise:
- generating a long-term keypair comprising a long-term public key and a long-term private key;
- providing the long-term public key to the meeting system;
- receiving a server cryptographic signature from the meeting system, the server cryptographic signature being generated based on the meeting identifier, a user identifier of the leader, and the long-term public key of the leader;
- computing a participant cryptographic signature for the leader using the long-term private key based on data comprising the long-term public key, the short-term public key, the meeting identifier, and the user identifier of the leader; and
- causing the server cryptographic signature and the participant cryptographic signature accessible by other participants of the video meeting for verifying an authenticity of the leader.

\* \* \* \* \*